UNITED STATES PATENT OFFICE.

JOHN R. YOUNG, JR., OF NORFOLK COUNTY, VIRGINIA.

FERTILIZER.

SPECIFICATION forming part of Letters Patent No. 278,480, dated May 29, 1883.

Application filed March 14, 1883. (No specimens.)

*To all whom it may concern:*

Be it known that I, JOHN R. YOUNG, Jr., a citizen of the United States, residing in the county of Norfolk and State of Virginia, have invented a new and useful Improvement in Fertilizers, of which the following is a specification.

My invention consists in the compounding of phosphatic guano and night-soil with sulphuric acid, whereby the night-soil is rendered inoffensive and a highly-effective and valuable fertilizer produced by the reciprocal and combined chemical action of the ingredients.

In carrying out my invention I take about one hundred gallons of night-soil as it comes from the vault, four hundred pounds of phosphatic guano, and one hundred and seventy-five pounds of sulphuric acid. These materials are placed in a tank or other suitable vessel and thoroughly mixed together, either by hand or by aid of machinery. When the resulting chemical action is complete the compound is evaporated to dryness by exposure to the atmosphere on drying-beds, or by aid of suitable drying machinery. After being pulverized it is ready for use.

Phosphatic guanos are those which contain a large percentage of phosphoric acid combined with lime, forming phosphate of lime. When such are treated with sulphuric acid chemical decomposition ensues, resulting in the formation of soluble superphosphate and sulphate of lime. Phosphatic guanos contain, also, carbonate of lime, the decomposition of which by sulphuric acid gives sulphate of lime, with the liberation of carbonic-acid gas, (carbon dioxide.)

The chemical action and changes resulting from the compounding with night-soil of phosphatic guano and sulphuric acid may be thus explained.

First. The ammonia of the night-soil is converted into a sulphate, thereby fixing it and preventing loss by volatilization.

Second. The phosphate of lime being acted on by the sulphuric acid, superphosphate and sulphate of lime are formed. The phosphoric acid is thereby rendered soluble or available as plant-food.

Third. The carbonate of lime being decomposed by the sulphuric acid, additional sulphate of lime is formed. The liberated carbonic-acid gas escaping throughout the mass makes it light and porous.

Fourth. Sulphate of lime, especially in the nascent state, has a strong affinity for water. The large percentage of it formed in the compound aids effectually in reducing the moisture and setting the mass.

Fifth. The heat generated by the resulting chemical action in presence of organic matter causes a deoxidation of a portion of the sulphuric acid, liberating sulphurous-acid gas, (sulphur dioxide,) which acts as a powerful deodorizer and disinfectant. The strongest (66° Baumé) acid is important.

As the natural phosphatic-guano deposits vary in the per cent. of phosphate of lime and the availability of its phosphoric acid, the proportions of ingredients in the compound may be varied to suit the strength of material used and amount of phosphoric acid desired.

The compound resulting from the combination of ingredients named and chemical action described is an ammoniated superphosphate containing the combined valuable properties of night-soil and phosphatic guano in the most available condition for plant-food. My compound thus avails and utilizes the valuable fertilizing materials named—to wit, night-soil and phosphatic guano—in much more effective condition than heretofore obtained by compounding them separately with sulphuric acid. After the compound is thoroughly decomposed, evaporated to dryness, and pulverized, it is ready for bagging.

My invention possesses the important advantage of depriving night-soil of its offensive odor, with other objectionable properties, and rendering it fine and dry, so it can be sown by machinery or from the hand without offense to the person, these results being accomplished by the addition of only such articles as add to its value as a fertilizer, while it retains all its own valuable qualities.

Having thus described my invention, the following is what I claim as new therein and desire to secure by Letters Patent:

A fertilizing composition consisting of night-soil, phosphatic guano, and sulphuric acid, substantially in the proportions set forth.

JOHN R. YOUNG, JR.

Witnesses:
B. W. CROMWELL,
WM. E. WHITEHURST.